United States Patent [19]

Marschner et al.

[11] Patent Number: 4,479,403

[45] Date of Patent: Oct. 30, 1984

[54] HARMONIC-DRIVE ASSEMBLY

[75] Inventors: Heinz Marschner, Kressbronna; Fritz Heinemann, Friedrichshafen; George Marsland, Kressbronn, all of Fed. Rep. of Germany

[73] Assignee: Zahnradfabrik Friedrichshafen Aktiengesellschaft, Friedrichshafen, Fed. Rep. of Germany

[21] Appl. No.: 504,239

[22] Filed: Jun. 14, 1983

Related U.S. Application Data

[62] Division of Ser. No. 202,747, Oct. 31, 1980, Pat. No. 4,425,822.

[30] Foreign Application Priority Data

Nov. 2, 1979 [DE] Fed. Rep. of Germany ....... 2944123
Nov. 2, 1979 [DE] Fed. Rep. of Germany ....... 2944124

[51] Int. Cl.³ ............................................. F16H 37/04
[52] U.S. Cl. ........................................ 74/640; 74/804
[58] Field of Search ................. 74/640, 798, 804, 805, 74/797

[56] References Cited

U.S. PATENT DOCUMENTS

| | | | |
|---|---|---|---|
| 2,906,143 | 9/1959 | Musser | 74/640 |
| 3,088,333 | 5/1963 | Musser | 74/640 |
| 3,196,713 | 7/1965 | Robinson | 74/640 |
| 3,362,254 | 1/1968 | Lewis | 74/640 |
| 3,407,902 | 10/1968 | Musser | 74/640 |
| 3,424,432 | 1/1969 | Humphreys | 74/640 X |
| 3,523,488 | 8/1970 | Robinson | 74/640 X |
| 3,918,326 | 11/1975 | Kida et al. | 74/640 X |
| 3,996,816 | 12/1976 | Brighton | 74/640 |
| 4,003,272 | 1/1977 | Volkov et al. | 74/640 |
| 4,237,751 | 12/1980 | Davis | 74/640 X |

FOREIGN PATENT DOCUMENTS

| | | | |
|---|---|---|---|
| 1135259 | 8/1962 | Fed. Rep. of Germany | 74/640 |
| 1264590 | 2/1972 | United Kingdom | 74/640 |
| 180450 | 1/1966 | U.S.S.R. | 74/640 |
| 648767 | 2/1979 | U.S.S.R. | 74/640 |
| 746144 | 7/1980 | U.S.S.R. | 74/640 |
| 868190 | 9/1981 | U.S.S.R. | 74/640 |

OTHER PUBLICATIONS

"Harmonic Drive Division", United Shoe Machinery Corporation.
"Mechanisms, Linkages, and Mechanical Controls", N. P. Chironis, p. 257.

Primary Examiner—Leslie A. Braun
Assistant Examiner—Dwight G. Diehl
Attorney, Agent, or Firm—Karl F. Ross; Herbert Dubno

[57] ABSTRACT

One embodiment of a harmonic-drive device insertable, e.g., into a clutch housing having elevated fluid pressures comprises a cup-shaped member with a flexible cylindrical inserted in a casing and rigidly connected thereto, the cup member bearing at its end a pair of substantially cylindrical supports in which a drive shaft is rotatably journaled. The shaft bears a mechanical wave generator which deforms the middle portion of the cup wall into an elliptical cross-section, whereby splines on opposite sides of the cup wall are shifted to mesh with inwardly projecting teeth of a pair of rings, one ring having teeth greater in number than the splines and being attached to a motion-output component rotatably and slidably secured to the cup casing. The supports in the cup are tapered to a minimum diameter at their inner ends substantially equal to the minor axis of the elliptical cross-section. In another embodiment of the device, the wave generator and the supports are formed as an enlargement of the drive shaft provided on an outer surface with ribs or sealing stripes subdividing the surface of the enlargement into a matrix of compartments.

The cross-section of the shaft enlargement varies from circular at the ends to elliptical in the center and the compartments are connected to a hydraulic circuit for being pressurized by a lubricating fluid.

1 Claim, 9 Drawing Figures

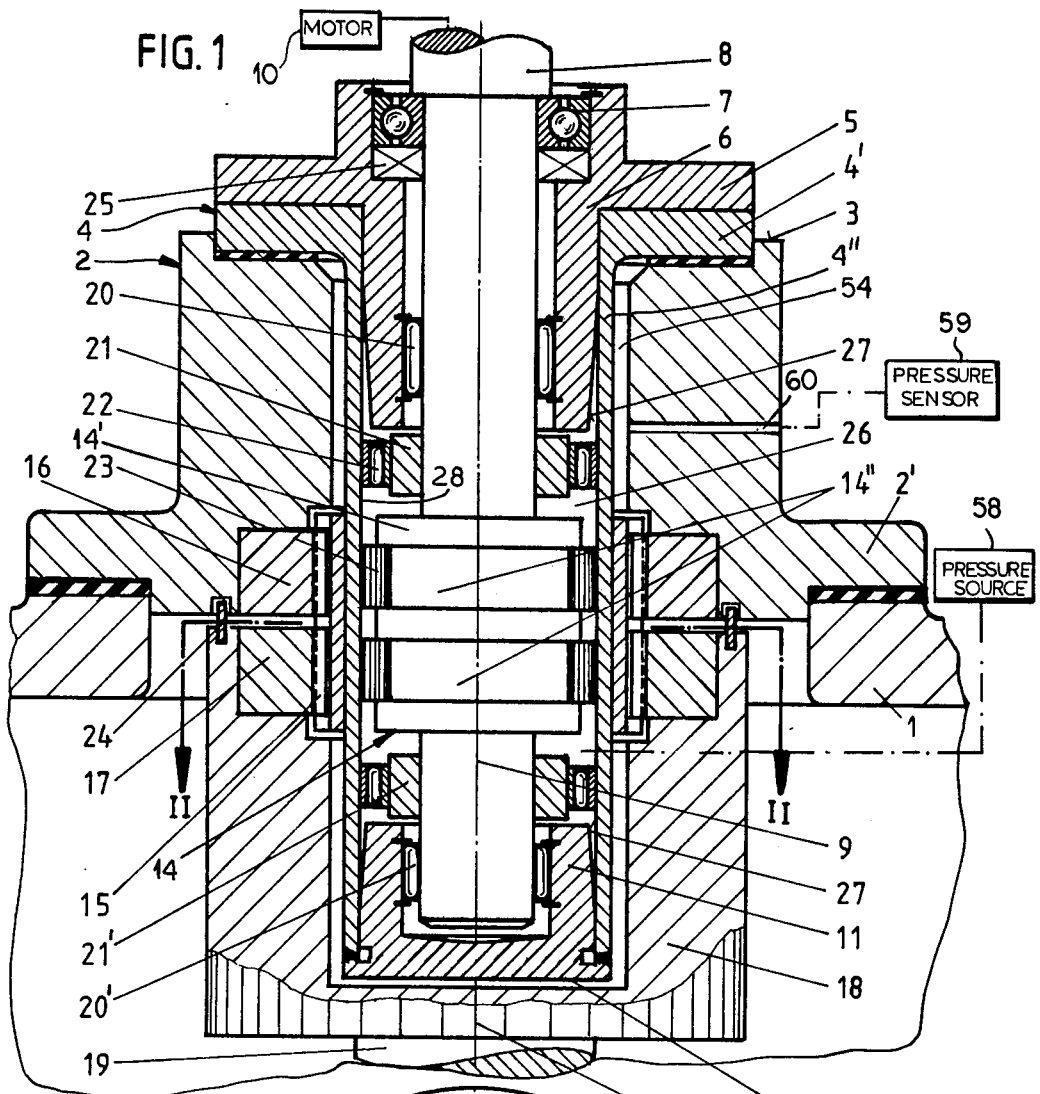
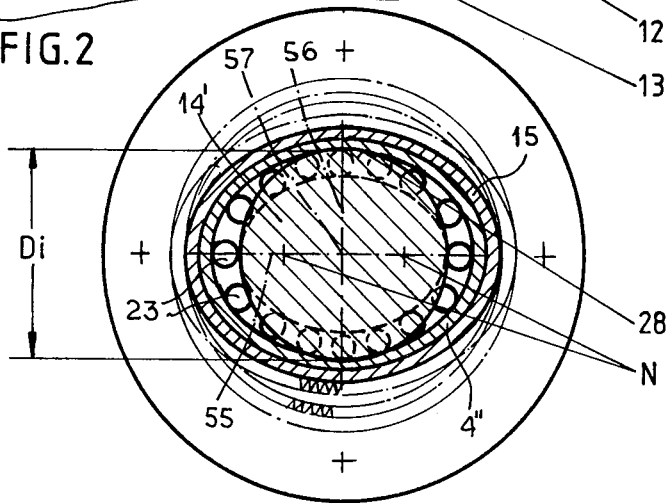

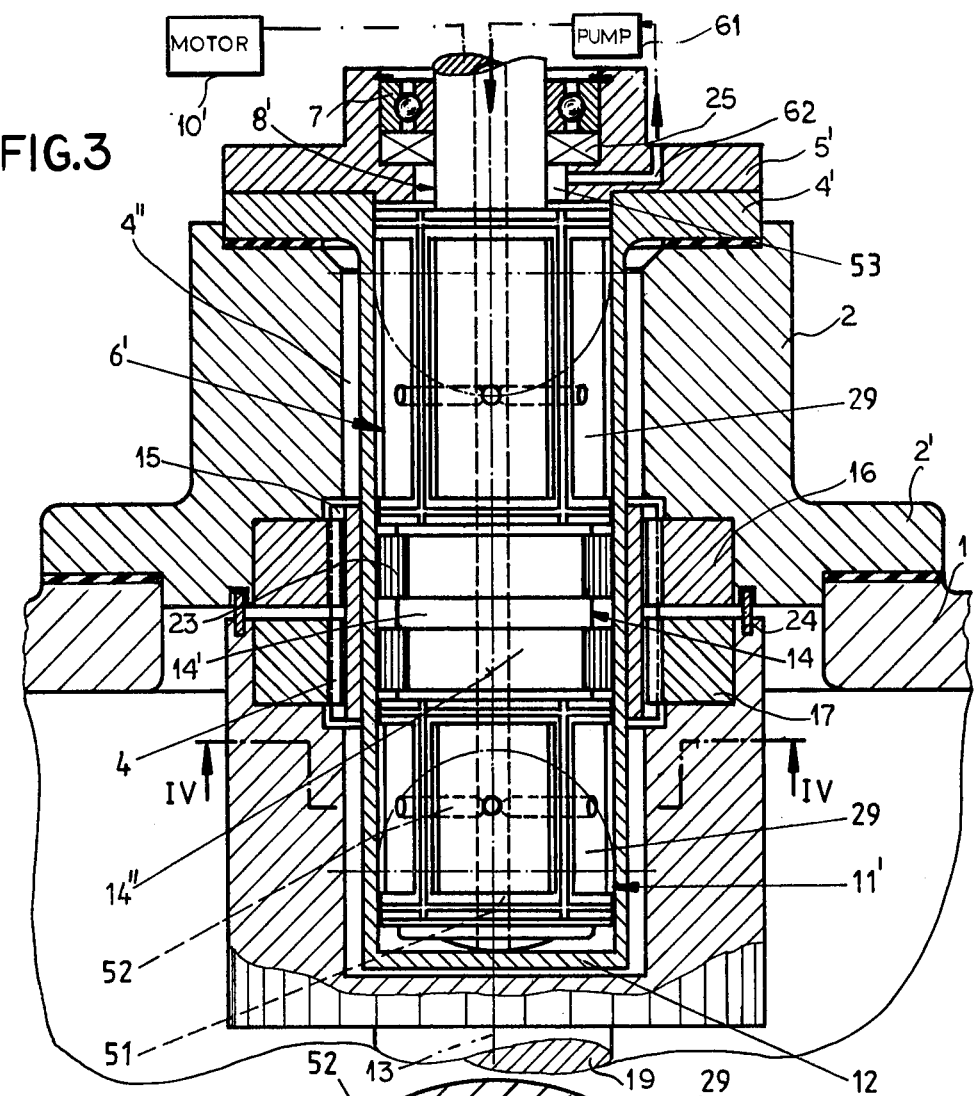
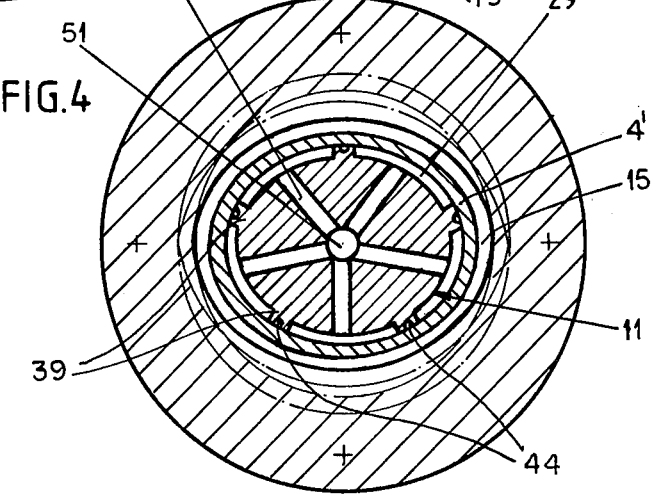

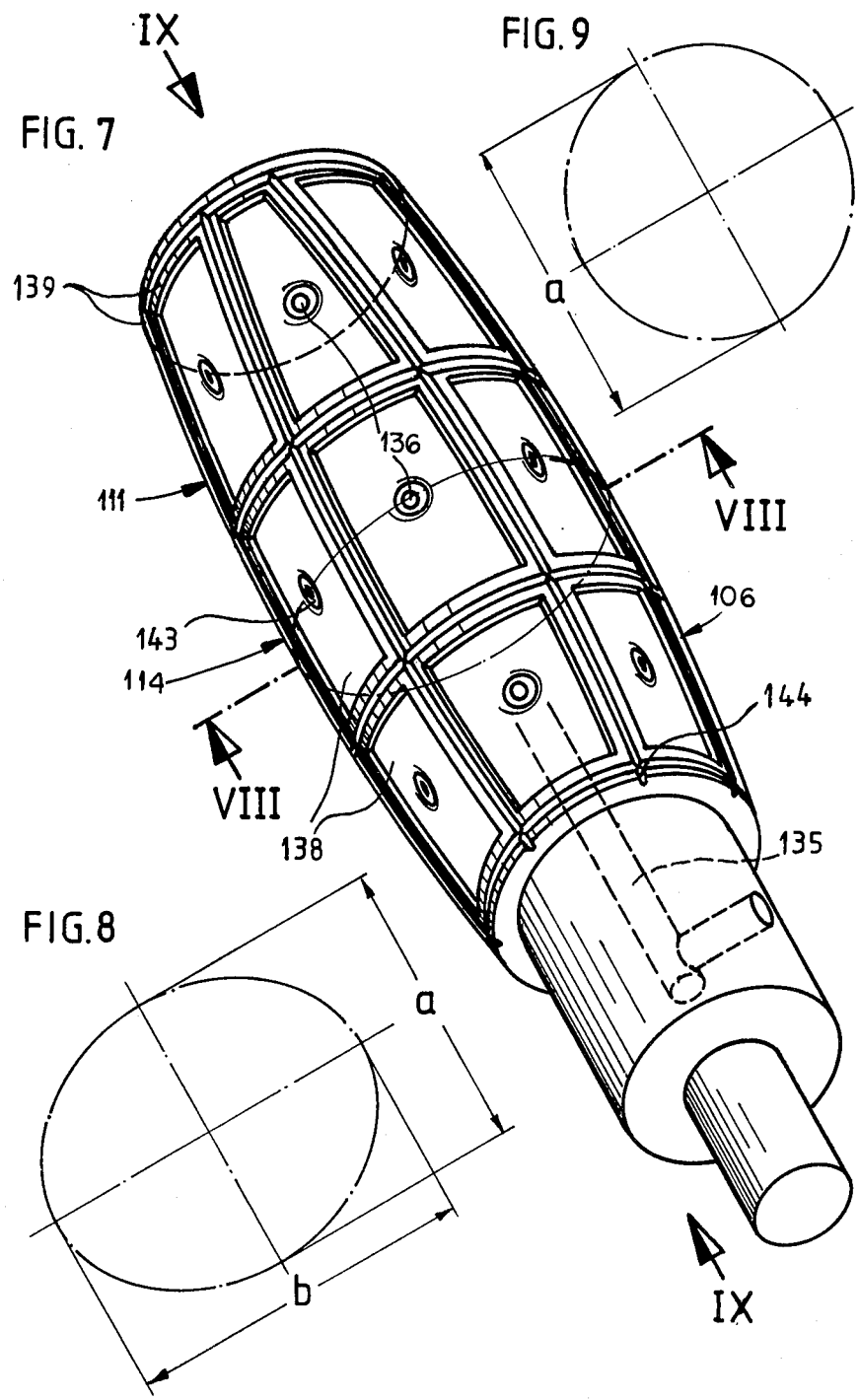

HARMONIC-DRIVE ASSEMBLY

This application is a division of application Ser. No. 202,747, filed Oct. 31, 1980 now U.S. Pat. No. 4,425,822

FIELD OF THE INVENTION

Our present invention relates to a motion-transmitting device of the harmonic-drive type, particularly for use in shifting assemblies in armature and clutch mechanisms.

BACKGROUND OF THE INVENTION

Shifting assemblies in armature and clutch mechanisms generally require a motion-transmitting device which steps down the rotation rate of the primary power source and which is insertable into an environment having a fluid pressure different from the internal pressure of the motion-transmitting device, e.g., into a pipe of a clutch housing. Motion-transmitting devices of the harmonic-drive type for use in these applications are described in German patent document Ser. No. 1,135,259 and also in the text "Gear Handbook", edited by Darle W. Dudley and published by McGraw-Hill (1962).

It is mentioned in the German patent document 1,135,259 that the use of ball bearings in a harmonic-drive device is essential for lowering the friction coefficients and for increasing efficiency. The balls are seated with a narrow tolerance between the inner and outer races, the spreading of the inner race along one axis causing the outer race to assume a substantially elliptical form. Upon a rotation of the inner race, two waves or moving lobes are produced in the outer race. In order to ensure the driving of a secondary or motion-output component disposed on the other side of the bearing assembly from the driving or input component, more specifically on the other side of a flexible wall member from the bearing, it is suggested to use bearings with at least 36 balls.

The outer race of the wave-generating bearing must be sufficiently thin to prevent loading beyond its elastic limit. The spreading of the bearing along one axis and the compression along an orthogonal axis results in increased play of balls at the troughs of the generated waves. The inner race must be supported on each side of the wave crests in the event of a load arising on the bearing there.

The disposition of the balls and the races for different loading conditions and different diameters has been problematic. In spite of the general durability of strength or harmonic-drive assemblies, it has proven necessary to limit the application thereof in situations where additional stresses might arise in the flexible wall member. Inwardly projecting teeth of a ring gear meshing at points spaced from the wave crests with teeth on the outer surface of the wall member are frequently apt to distort or destroy the wave shape under increased loading conditions, the disadvantageous result being more likely at higher operating temperatures.

The possible distortion or destruction of the wave shape in the flexible wall member has led to the proposal that this member be supported or braced on the side of the wave generator. Ball bearings provided for this purpose are ineffectual in equalizing support in different regions of the wall member. Because of excessive strains and raised external pressures, the need for sufficient lubrication is readily apparent.

The utilization of conventional harmonic-drive assemblies is, therefore, very limited in applications involving elevated external temperatures and pressures, extended operation times and sudden mechanical loadings or shocks. The use of conventional reinforced harmonic-drive is further reduced by the costs of building in the bracing elements. Because these bracing bearings are subjected to unusually high loads, their expected life span is short, which contributes even further to increased costs and reduced efficiency.

Conventional harmonic-drive devices are generally limited to situations involving low external pressures, because higher pressures distort or bend the flexible wall members and thus quickly destroy the devices.

OBJECTS OF THE INVENTION

An object of our present invention is to provide an improved motion-transmitting device of the harmonic-device type which is adaptable to elevated temperatures and pressures, long operation times and high loads.

A more particular object of our present invention is to provide such a device which has improved sealing qualities.

Another particular object of our present invention is to provide such a device which has a reduced number of parts and lowered internal friction.

Yet another object of our present invention is to provide such a device which is efficient even with a large rotation-rate step-down.

Yet another object of our present invention is to provide such a device which has a significantly shorter length than harmonic-drive devices using a bellows-type seal.

Another particular object of our present invention is to provide such a device in which the flexible wall member is subjected to an equalized support or bracing.

SUMMARY OF THE INVENTION

A motion-transmitting device of the harmonic-drive type comprises, according to our present invention, a cup-shaped member with a flexible cylindrical wall disposed in a housing and provided on an outer surface with a multiplicity of elongate gear teeth extending parallel to an axis of symmetry of the wall, the member being rigidly attached at an open end to the housing. A shiftable component rotatably and slidably attached to the housing at a side thereof opposite the open end of the cup forms a motion-output element of the device. A rotatable mechanical wave generator is disposed in the cup for contacting an inner surface of the cylindrical wall and for deforming the same to assume an elliptical cross-section along a portion of the height of the wall, rotary-drive source being connected to the wave generator for rotating the same and thereby a major axis of the elliptical cross-section of the wall. An inwardly toothed first ring gear rigid with the housing encircles the cup, this gear having teeth equal in number to the elongate gear teeth or splines and meshing therewith only at substantially opposite sides of the cup member, while an inwardly toothed second ring gear rigid with the output component and longitudinally spaced from the first ring gear has teeth greater in number than the splines on the cup wall and meshing therewith only at substantially opposite sides of the cup member. A reinforcer is provided in the cup member at least at the open end thereof for bracing the wall against substantial deformation at points spaced from the wave generator. Means are included for sealing the housing.

According to another feature of our present invention, the reinforcer is rigid with the cup member and includes a substantially cylindrical support inserted into the cup at the open end thereof. The support has at one end an outer diameter substantially equal to the inner diameter of the wall at the open end of the cup member, this outer diameter decreasing from a maximum at the one end to a minimum at another end of the support spaced from the open cup end. The minimum diameter is advantageously equal to an inner minor axis of the elliptical cross-section of the deformed cylindrical wall.

According to yet another feature of our present invention, the rotary drive source includes a drive shaft traversing the support and connected to the wave generator. The wave generator is disposed approximately midway along the height of the cup member and the reinforcer includes an additional support inserted in the cup member at a closed end thereof. The additional support, like the support at the open end, has a generally annular cross-section with an outer diameter at the closed cup end substantially equal to the inner diameter of the wall in an undeformed state thereof. The outer diameter of the annular cross-section decreases toward the wave generator to attain at the inner end of the additional support a minimum valve substantially equal to an inner minor axis of the elliptical cross-section of the deformed portion of the cylindrical cup wall. The drive shaft has an axial extension rotatably journaled in the additional support and connected to the wave generator.

According to yet another feature of our present invention, the reinforcer includes a cylindrical bearing assembly radially disposed between the shaft and the wall and longitudinally disposed between one of the supports and the wave generator. Preferably, this bearing is provided with a mounting ring of flexible material, e.g. rubber, for resiliently bracing the cup wall against buckling and denting possibly arising from the cylindrical deformation due to the wave generator.

Pursuant to an alternative embodiment of our present invention, the reinforcer includes a hydrostatic bearing at least at the open end of the cup member. The drive shaft includes a radially enlarged portion longitudinally disposed between the wave generator and the open end of the cup member, the shaft enlargement being provided on an outer surface with a multiplicity of ribs serving as sealing strips and defining, together with the outer cylidrical surface of the shaft enlargement and the inner surface of the cup wall, a multiplicity of thin bearing compartments. The reinforcer includes a fluid circulator to the compartments for channeling pressurizing fluid thereto.

According to another feature of the alternative embodiment, the wave generator is disposed substantially midway along the height of the cup wall and the shaft includes an additional radial enlargement inserted in the cup member at the closed end thereof. The additional enlargement, like the enlargement at the open end of the cup, is provided on an outer surface with a multiplicity of ribs serving as sealing strips and defining, together with the outer cylindrical surface of the additional shaft enlargement and the inner surface of the cup wall, a multiplicity of relatively thin compartments. These compartments are connected to via the conduit system to the circulator for being pressurized with fluid therefrom.

According to yet another feature of the alternative embodiment of our present invention, the wave generator is formed as a radial enlargement of the drive between the shaft enlargements at the ends of the cup member. The three enlargements together form a continuous shaft body surrounded by the cup member and having a circular cross-section at the ends of the cup member and an elliptical cross-section midway along the height of the cup wall. The shaft body is formed on an outer surface with a criss-crossing network of ribs serving as sealing strips and defining, together with an outer surface of the shaft body and the inner surface of the cup wall, a matrix of hydrostatic-bearing compartments. The compartments are pressurized by the circular via the conduit system.

If the wave generator is not formed continuously with the supports, it is advantageously formed as an elliptical roller bearing mounted on the drive shaft.

According to more particular features of the alternative embodiment of our present invention, the conduit system includes a main bore extending axially in the drive shaft and a multiplicity of secondary bores extending radially in the shaft from the main bore to the compartments, while the ribs are provided with grooves communicating with the compartments and with a fluid-storage chamber in the housing, the circulator being connected to this chamber for drawing therefrom fluid forced as excess from the compartments.

Pursuant to further, more particular features of our present invention, the shiftable component is a cup-shaped element enclosing the flexible cup member at the closed end thereof and the sealing means includes a ring seal for preventing coarse-grained particles from entering a space between the housing and the cup wall, thereby reducing wear of the splines and the gear teeth. The device may further comprise a monitor or pressure sensor operatively connected to the space between the wall and the housing for detecting changes in fluidic pressure due to fracture of the member.

A harmonic-drive device according to our present invention provides a maximum of support or bracing for the flexible cup wall. This heightened protection against bending and denting of the cup wall results in an increased life span and a greater loadability of the device. Especially compact construction of the device further contributes to increased life span and loadability.

A device according to the alternative embodiment of our present invention, i.e. a device having a hydrostatic bearing, is subjected to improved lubrication and reduced friction in comparison with conventionally supported cup walls. Whatever heat is produced is distributed over and eventually absorbed by the circulating fluid of the hydrostatic bearing. This fluid circulation also enables a device according to our present invention to withstand relatively elevated ambient temperatures, a heat exchanger being advantageously provided in the hydraulic circuit or conduit system for optimizing heat absorption from the cup member. Heat distribution and absorption also increases the life span and loadability of the harmonic-drive device.

It is to be noted that the supports or hydrostatic bearings according to our present invention are usable in harmonic-drive assemblies wherein the driving elements are disposed outside the cup member rather than within it. Stresses are minimized at least in part by distribution or equalization over the surface of the cylindrical cup wall. This equalization of stresses is particularly effective when hydrostatic-bearing compartments line the inner cylindrical surface of the cup member. In addition, hydrostatic bearings eliminate extraneous fatiguing stresses due to the vibrations of ball bearings, particularly ball bearings distorted by the wave generator.

According to further feature of our present invention, the conduit system is provided at the compartments with throttles, e.g. nozzle members or unidirectional-flow valves, for ensuring that the pressurization of the compartments is the same (equalized).

BRIEF DESCRIPTION OF THE DRAWING

These and other features of our present invention will now be described in detail, reference being made to the accompanying drawing in which:

FIG. 1 is a partially schematic cross-sectional view of a motion-transmitting device of the harmonic-drive type, according to our present invention;

FIG. 2 is a partially schematic cross-sectional view taken along line II—II in FIG. 1;

FIG. 3 is a partially schematic cross-sectional view of another device similar to the device shown in FIG. 1;

FIG. 4 is a partially schematic cross-sectional view taken along line IV—IV in FIG. 3;

FIG. 7 is a partially schematic perspective view of the wave generator shown in FIG. 5;

FIG. 8 is a diagram of a central cross-section of the generator of FIGS. 5 and 7, taken along line VIII—VIII in FIG. 7; and FIG. 9 is a diagram of an end cross-section of the generator of FIGS. 5 and 7, taken in the direction of arrow IX or arrow IX' in FIG. 7.

SPECIFIC DESCRIPTION

Figures 5, 6:
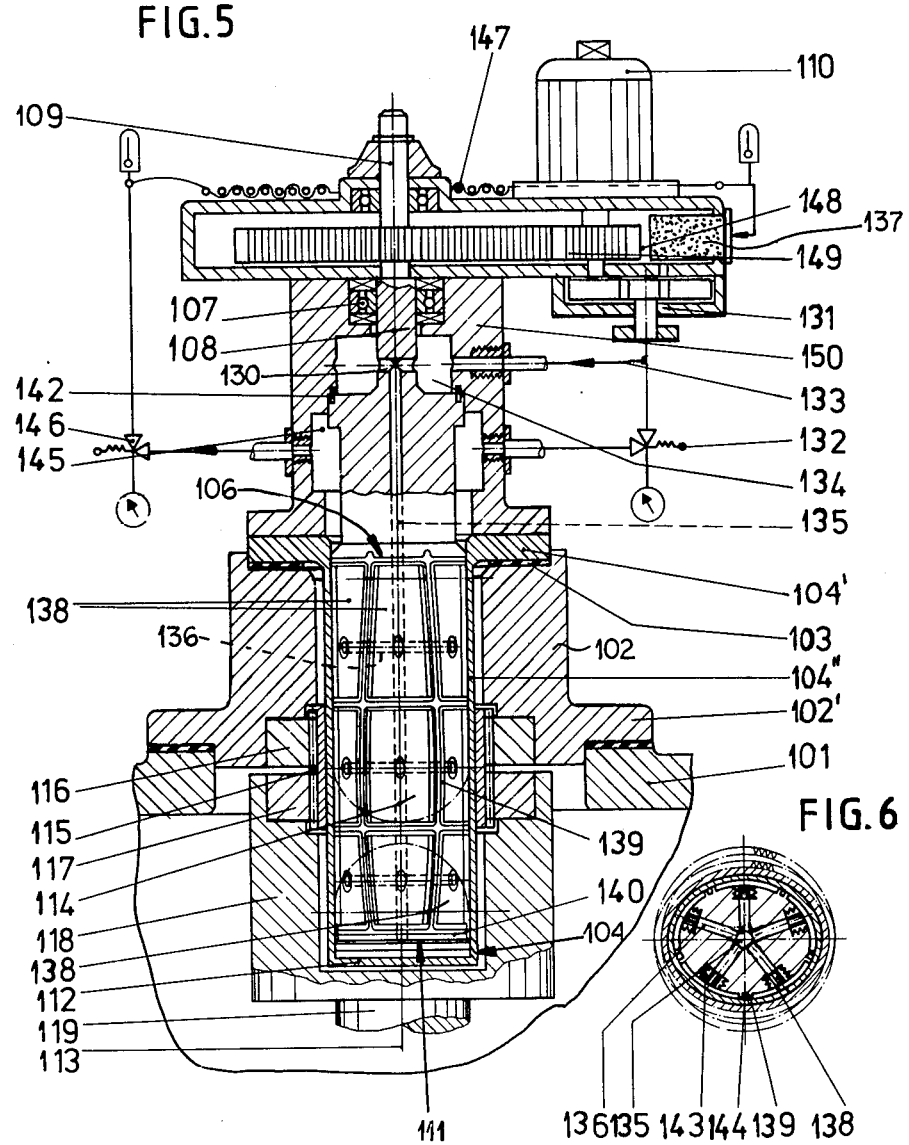
FIG. 5 is a partially schematic cross-sectional view of another embodiment of a motion transmitting device of the harmonic-drive type, according to our present invention, showing a mechanical wave generator with attached supporting members.
FIG. 6 is a partially schematic cross-sectional view taken along line VI—VI in FIG. 5.

As illustrated in FIG. 1, a motion-transmitting device of the harmonic-drive type, particularly useful in valve-actuating assemblies and materials-handling application, comprises, according to our present invention, a cup-shaped member 4 having a flexible metal wall 4" traversing a housing 2 and an annular flange 4' rigidly attached to a face 3 of the housing. Housing 2 is in turn rigidly secured to an armature casing 1 via an annular flange 2'.

A pair of substantially cylindrical reinforcers or supports 6, 11 are inserted in member 4 at opposite ends thereof for bracing wall 4" during cyclical deformation of a midsection of the wall by a mechanical wave generator 14. Support 6 has a radially projecting annular extension 5 fixed to flange 4', while support 11 forms a closed-end wall 12 of cup 4. At the ends of this cup, supports 6, 11 have outer diameters substantially equal to the diameter of an inner surface 28 of wall 2". The supports are tapered so that their outer diameters decrease from a maximum at the outer ends of the supports to a minimum at inner ends 27.

A drive shaft 8 operatively coupled to a source 10 of rotary power is connected to mechanical wave generator 14. This generator comprises a cylindrical body 14' formed with a pair of parallel ellipsoidal tracks 14" each carrying or guiding a multiplicity of roller bearings 23 (see FIG. 2). Shaft 8 is rotatably mounted in support 6 by a ball bearing 7 and a roller bearing 20 and has a coaxial extension 9 connected to wave generator 14 and rotatably journaled in support 11 by a roller bearing 20'. Two further bearings 21, 21' for supplementing the bracing of cylindrical wall 14" by supports 6, 11 are axially disposed between the same and wave generator 14 on opposite sides thereof, these bearings having rollers 22 and riding on inner races rigid with shaft 8 and extension 9, respectively.

Wall 4" is provided on an outer surface with a multiplicity of splines or elongate gear teeth 15 extending parallel to a rotation axis 13 of shaft 8, body 14' and extension 9, these teeth being formed substantially midway along the height of wall 4" and having a length substantially equal to the height or axial length of wave-generator 14'. A pair of inwardly toothed ring gears 16, 17 encircle wall 4" in the region of wave generator 14, gear 16 being rigidly attached to housing 2 and having teeth equal in number to splines 15. Gear 17 is secured to a cup-shaped shifting component 18, e.g. a coupling cage or a clutch housing, rotatably and slidably connected to housing 2 and has teeth greater in number than splines 15, whereby a rotation-rate step-down is effectuated from drive or input shaft 8 to an output shaft 19 fixed to component 18. This component is provided with a slip ring 24 for sealing housing 2 to prevent coarse-grained impurities from entering a substantially cylindrical space 54 between wall 4" and housing 2, thereby decreasing wear of spline 15 and gears 16, 17.

As shown in FIG. 2, wave generator 14 deforms wall 4" to assume an elliptical cross-section. This deformation causes splines 15 on opposite sides of wall 4" to mesh with teeth of ring gears 16 and 17. As shaft 8, body 14' and extension 9 rotate about axis 13, the major axis 55 and the minor axis 56 of the elliptical cross-section of wall 4" rotate about their intersection point 57, which is located on axis 13. The waves or revolving lobes of the midsection of wall 4" due to the operation of wave generator 14 induce the rotation of component 18 via the coaction of splines 15 and the teeth of gear 17.

As illustrated in FIG. 1, support 6 is advantageously provided with a ring seal 25 contacting shaft 8 to ensure closure of a space 26 in cup 4. This space is connected to a source 58 of fluidic pressure to supplement the bracing of wall 4" by supports 6, 11 and bearings 21, 21'. A pressure sensor communicating with space 54 via at least one capillary bore 60 may detect, in the pressure level of fluid in space 54, a rise caused by fracturing of wall 4". Alternatively, pressure source 58 may be linked to space 54 and sensor 59 adapted for detecting a fall in fluid pressure.

The outer diameters of supports 6, 11 decrease from maximum values at the ends of member 4 to minimum values at the inner ends of supports, these minimum values being substantially equal to the length Di of minor axis 56 (see FIG. 2). Supports 6, 11 and bearings 21, 21' function to increase the life span of member 4 by inhibiting bucking and denting which may result from the cyclical deformation of wall 4". Preferably, bearings 21, 21' include annular mounting elements rigid with shaft 8 and extension 9 and formed from a flexible substance, e.g. rubber, for resiliently bracing wall 4" under the wave-like stressing induced by generator 14.

As illustrated in FIG. 3, the reinforcing functions of supports 6, 11 and bearings 21, 21' are advantageously implemented, according to our present invention, by a pair of hydrostatic bearings 6', 11' comprising respective, similarly designated, radially enlarged portions of a drive shaft 8' operatively connected to a motor 10' and carrying wave generator 14, as heretofore described with reference to FIG. 1. Shaft enlargements 6' and 11' are provided on their cylindrical outer surfaces with a multiplicity of ribs or sealing strips 39 which define, together with the cylindrical surfaces of the shaft enlargements and the inner surface of wall 4", a multiplicity of relatively thin compartments or hydrostatic-bearing chambers 29. These compartments are supplied with fluid from a pump or pressure source 61 at least partially via a bore or conduit 51 extending axially through shaft 8' enlargement 6', body 14' and enlargement 11'. In each enlargement 6', 11' are formed a multiplicity of radial bores 52 communicating with conduit 51 and respective compartments 29. Oil or another liquid pumped into compartments 29 via conduit 51 and bores 52 is returned to source 61 partially via a network of grooves or channels 44 cut into ribs 39. Grooves 44 are connected to compartments 29 via transverse grooves (not shown in the surfaces of ribs 39 or via capillary bores (not shown) in the bodies of the ribs and communicate with an annular storage chamber 53 surrounding shaft 8' and having an output conduit 62 extending to pump 61.

As illustrated in FIG. 4, shaft enlargements 6' and 11' have elliptical cross-section at least in regions proximate to wave-generator body 14'. Preferably, the cross-sections of the shaft enlargements 6', 11' are circular at the open end and the closed end of cup 4, respectively, and become increasingly elliptical in the direction of body 14', the cross-sections of enlargements 6', 11' at the inner ends thereof being substantially identical to the elliptical cross-section imposed on wall 4" by wave generator 14. It is to be noted that enlargements 6', 11' and body 14' are rigid with shaft 8' and rotate therewith about axis 13 and that the fluid pressurizing compartments 29 serves both a bracing or support function and a lubricating function. Thus, friction is greatly reduced in the embodiment of our present invention illustrated in FIGS. 3 and 4.

As shown in FIG. 5, another motion-transmitting assembly of the harmonic-drive type comprises, according to our present invention, a drive shaft 108 journaled in a housing or casing 150 by a ball bearing 107 and provided with an axial extension 109 operatively connected via step-down power-transmission gears 149 to a motor 110. At an end opposite extension 109, shaft 108 is formed with three adjacent radial enlargements 106, 114 and 111 serving as a first support or brace, a mechanical wave generator and a second support, respectively. These enlargements are preferably a continuous shaft body or extension inserted into a cup-shaped member 104 having a flexible cylindrical wall 104" and an annular flange 104' fixed to casing 150 on one side and to a housing 102 on another side.

Housing 102 in turn has a flange 102' secured to an armature casing 101 at least partially surrounding a cup-shaped component 118, e.g., a clutch housing or a coupling cage, rotatably and slidably connected to housing 102. A slide ring (see FIG. 1) may be provided for sealing a gap between housing 102 and clutch component 118.

Wall 104" is formed on an outer surface with a multiplicity of elongate splines 115 extending parallel to an axis of rotation 113 of drive shaft 108. Owing to the deformation of wall 104" by wave generator 114, splines 115 on opposite sides of wall 104" are shifted radially into engagement with inwardly projecting teeth of a pair of ring gears 116, 117 encircling wall 104" and rigidly mounted on housing 102 and component 118, respectively. Gear 116 has teeth equal in number to the splines 115 on wall 104", while gear 117 has a great number of teeth.

As illustrated in FIGS. 5 and 6 and in greater detail in FIG. 7, shaft body 106, 111, 114 has at its ends a circular cross-section of radius a and at its center an elliptical cross-section with a minor axis of length a and a major axis of length b (see FIGS. 8 and 9). Thus, the width of body 106, 111, 114 in one plane including axis 113 is constant, while the body's width in another plane orthogonal to the first increases monotonically from a minimum at the outer ends of the supports 106, 111 to a maximum at the center of wave generator 114.

Body 106, 111, 114 is provided on an outer surface with a network of intersecting ribs 139 which serve as sealing strips and define, together with the outer surface of the body and the inner surface of cylindrical wall 104", a multiplicity of hydrostatic-bearing compartments 138. These compartments are charged with pressurizing fluid via an axial conduit 135 in shaft 108 and body 106, 111, 114 and via respective radial bores 136 extending from conduit 135 to compartments 138 (FIGS. 5 and 6). As shown in FIG. 5, conduit 135 communicates at an input end with a storage chamber 134 via one or more radical bores 130 in shaft 108, pressurizing fluid being fed to this chamber by a gear pump 131 energized by motor 110. Pump 131 is connected to chamber 134 via a pressure-regulating valve 132 and a duct 133.

Oil or another liquid pumped to compartments 138 via duct 133, chamber 134, conduit 135 and bores 136 is returned to pump 131 via a hydraulic circuit including grooves 144 in ribs 139, a storage chamber 145 in casing 150, a return-flow pressure-regulating valve 146, a heat exchanger 147, a filter 137 and a lubricating chamber 148 enclosing transmission train 149. Grooves or channels 144 communicate with compartments 138 via capillary bores or transverse grooves in ribs 139 and form a network surrounding body 106, 111, 114 for at least in part equalizing the pressure in compartments 138; at an end of body 106, 111, 114 opposite drive-shaft extension 109, groove network 114 is blocked by an annular sealing strip 140 encircling support 111, while at the other end of body 106, 111, 114 the groove network communicates with chamber 145. This chamber is sealed off from adjacent chamber 134 by a sealing strip 142 in the shape of a ring contacting shaft 108 and casing 150.

As heretofore described with reference to FIG. 3, the oil pumped into compartments 138 performs the dual function of supporting wall 104" against the cyclical stressing and straining caused by wave generator 114 and reducing the friction between ribs 139 and the surface of wall 104". The adequate pressurization of compartments 138 may be ensured by providing unidirectional-flow valves 143 (or nozzles) at the outer ends of bores or branching conduits 136 to prevent oil in the compartments from flowing back into the main conduit 135.

Instead of grooves 144, an eccentrically disposed second longitudinal bore (not shown) may be provided for draining excess fluid from hydrostatic-bearing compartments 138, this second or drainage bore communicating at an output end with chamber 145.

We claim:
1. A harmonic-drive device, comprising:
a housing;
a cup-shaped member with a flexible cylindrical wall disposed in said housing and provided on an outer surface with a multiplicity of elongate gear teeth extending parallel to an axis of symmetry of said wall, said member being rigidly attached at an open end to said housing;

a motion-output component mounted on said housing at a side thereof opposite the open end of said member;

motion-transmission means operatively linked to said member and to said component for transmitting rotary power from said member to said component;

stressing means including a rotatable mechanical wave generator for contacting a surface of said wall and deforming same to assume an elliptical cross-section along a portion of the height of said wall;

drive means operatively connected to said generator for rotating same and thereby a major axis of said elliptical cross-section;

insulating means for sealing said housing; and reinforcing means in said member for bracing said wall against deformation at points longitudinally spaced from said generator, said reinforcing means including means for introducing a fluid under pressure into said member.

* * * * *